US006990072B2

(12) United States Patent
Alasti et al.

(10) Patent No.: US 6,990,072 B2
(45) Date of Patent: Jan. 24, 2006

(54) METHOD AND APPARATUS FOR ARBITRATION SCHEDULING WITH A PENALTY FOR A SWITCH FABRIC

(75) Inventors: Mehdi Alasti, Rockville, MD (US); Kamran Sayrafian-Pour, Silver Spring, MD (US); Vahid Tabatabaee, Jessup, MD (US)

(73) Assignee: PTS Corporation, San Jose, CA (US)

( * ) Notice: Subject to any disclaimer, the term of this patent is extended or adjusted under 35 U.S.C. 154(b) by 799 days.

(21) Appl. No.: 09/928,747

(22) Filed: Aug. 14, 2001

(65) Prior Publication Data

US 2003/0035427 A1 Feb. 20, 2003

(51) Int. Cl.
*H04J 3/14* (2006.01)

(52) U.S. Cl. ...................... 370/230; 370/386; 370/392; 370/395.4; 370/412; 370/419; 370/447; 370/462

(58) Field of Classification Search ................ 370/230, 370/235, 351, 386, 389, 392, 395.4–395.43, 370/412–419, 422, 447, 461, 462
See application file for complete search history.

(56) References Cited

U.S. PATENT DOCUMENTS 5,517,495 A 5/1996 Lund et al.
5,581,566 A 12/1996 St. John et al.
5,689,644 A 11/1997 Chou et al.
5,699,520 A 12/1997 Hodgson et al.
5,748,629 A 5/1998 Caldara et al.
5,867,705 A 2/1999 Mano
5,923,644 A 7/1999 McKeown et al.
5,923,656 A 7/1999 Duan et al.
6,014,367 A 1/2000 Joffe
6,032,218 A 2/2000 Lewin et al.
6,044,061 A 3/2000 Aybay et al.
6,097,705 A 8/2000 Ben-Michael et al.
6,134,217 A 10/2000 Stiliadis et al.

(Continued)

FOREIGN PATENT DOCUMENTS

GB 2328590 2/1999

(Continued)

OTHER PUBLICATIONS

McKeown, Nick, "iSLIP: A Scheduling Algorithm for Input-Queued Switches", *IEEE Transactions on Networking*, vol. 7, No. 2, Apr. 1999, pp. 1-36.

(Continued)

*Primary Examiner*—Steven Nguyen
*Assistant Examiner*—Roberta Shand
(74) *Attorney, Agent, or Firm*—Martine Penilla & Gencarella, LLP

(57) ABSTRACT

Arbitration for a switch fabric (e.g., an input-buffered switch fabric) is performed. The switch fabric has a set of ports. Each port from the set of ports is associated with its own set of links. The set of ports includes a first port and a second port. A link is selected from the set of links associated with the first port based on a weight value associated with each remaining link associated with a candidate packet and being from the set of links associated with the first port. A first penalty for a weight vector entity associated with the first port is determined by based on a weight value associated with each link from a first subset of links from the set of links for the first port. Each link from the first subset of links is not associated with a candidate packet.

25 Claims, 9 Drawing Sheets

U.S. PATENT DOCUMENTS

| | | | | |
|---|---|---|---|---|
| 6,185,221 | B1 | 2/2001 | Aybay | |
| 6,188,690 | B1 | 2/2001 | Holden et al. | |
| 6,198,723 | B1 | 3/2001 | Parruck et al. | |
| 6,240,102 | B1 | 5/2001 | Asano | |
| 6,246,256 | B1 | 6/2001 | Liu et al. | |
| 6,442,135 | B1 | 8/2002 | Ofek | |
| 6,477,144 | B1 * | 11/2002 | Morris et al. | 370/230.1 |
| 6,516,192 | B1 * | 2/2003 | Spaur et al. | 455/450 |
| 6,714,555 | B1 * | 3/2004 | Excell et al. | 370/418 |
| 2001/0001608 | A1 * | 5/2001 | Parruck et al. | 370/232 |

FOREIGN PATENT DOCUMENTS

| | | |
|---|---|---|
| WO | WO 99/14916 | 3/1999 |
| WO | WO 99/35792 | 7/1999 |
| WO | WO 99/43131 | 8/1999 |
| WO | WO 99/66677 | 12/1999 |
| WO | WO 00/38375 | 6/2000 |
| WO | WO 00/38376 | 6/2000 |

OTHER PUBLICATIONS

A. C. Kam et al., "Linear complexity algorithms forQoS support in input-queued switches with no speedup", d'Arbeloff Laboratory for Information Systems and Technology, Massachusetts Institute of Technology, pp. 1-34.

T. E. Anderson et al., "High Speed Switch Scheduling for Local Area Networks", Digital System Research Center, Palo Alto California, Apr. 26, 1993, pp. 1-37.

A. Mekkittikul et al., "A Practical Algorithm to Achieve 100% Throughput in Input-Queued Switches", *IEEE Infocom 98*, vol., 2, pp. 792-799, Apr. 1998, San Francisco, CA.

"Conservative Synchronization Algorithms—Chapter 3"—pp. 51-91.

* cited by examiner

METHOD AND APPARATUS FOR ARBITRATION SCHEDULING WITH A PENALTY FOR A SWITCH FABRIC

CROSS-REFERENCE TO RELATED APPLICATIONS

The present invention is related to following applications: "Method and Apparatus Parallel, Weighted Arbitration Scheduling for a Switch Fabric" application Ser. No. 09/928,509, and "Method and Apparatus for Weighted Arbitration Scheduling Separately at the Input Ports and the Output Ports of a Switch Fabric" application Ser. No. 09/928,533 both of which are incorporated herein by reference.

BACKGROUND OF THE INVENTION

The present invention relates generally to telecommunication switches. More specifically, the present invention relates to parallel, weighted arbitration scheduling for a switch fabric (e.g., an input-buffered switch fabric).

Known switch fabrics with crossbar architectures exist where data cells received on the multiple input ports of the switch are sent to the various output ports of the switch. Scheduling techniques ensure that the data cells received from different input ports are not sent to the same output port at the same time. These techniques determine the temporary connections between input ports and output ports, via the switch fabric, for a given time slot.

Scheduling techniques can be evaluated based on a number of performance requirements to a broad range of applications. Such performance requirements can include, for example, operating at a high speed, providing a high throughput (i.e., scheduling the routing of as many data cells as possible for each time slot), guaranteeing quality of service (QoS) for specific users, and being easily implemented in hardware. Known scheduling techniques trade one or more performance areas for other performance areas.

For example, U.S. Pat. No. 5,500,858 to McKeown discloses one known scheduling technique for an input-queued switch. This known scheduling technique uses rotating priority iterative matching to schedule the routing of data across the crossbar of the switch fabric. When the data cells are received at the input ports in a uniform manner (i.e., in a uniform traffic pattern), this known scheduler can produce a high throughput of data cells across the switch fabric. When the data cells are received at the input ports, however, in a non-uniform manner more typical of actual data traffic, the throughput from this known scheduling technique substantially decreases.

Thus, a need exists to provide a scheduling technique that can perform effectively for multiple performance requirements, such as for example, operating at a high speed, providing a high throughput, guaranteeing QoS, and being easily implemented in hardware.

SUMMARY OF THE INVENTION

Arbitration for a switch fabric (e.g., an input-buffered switch fabric) is performed. The switch fabric has a set of ports. Each port from the set of ports is associated with its own set of links. The set of ports includes a first port and a second port. A link is selected from the set of links associated with the first port based on a weight value associated with each remaining link associated with a candidate packet and being from the set of links associated with the first port. A first penalty for a weight vector entity associated with the first port is determined by based on a weight value associated with each link from a first subset of links from the set of links for the first port. Each link from the first subset of links is not associated with a candidate packet.

DETAILED DESCRIPTION

Figure 1:
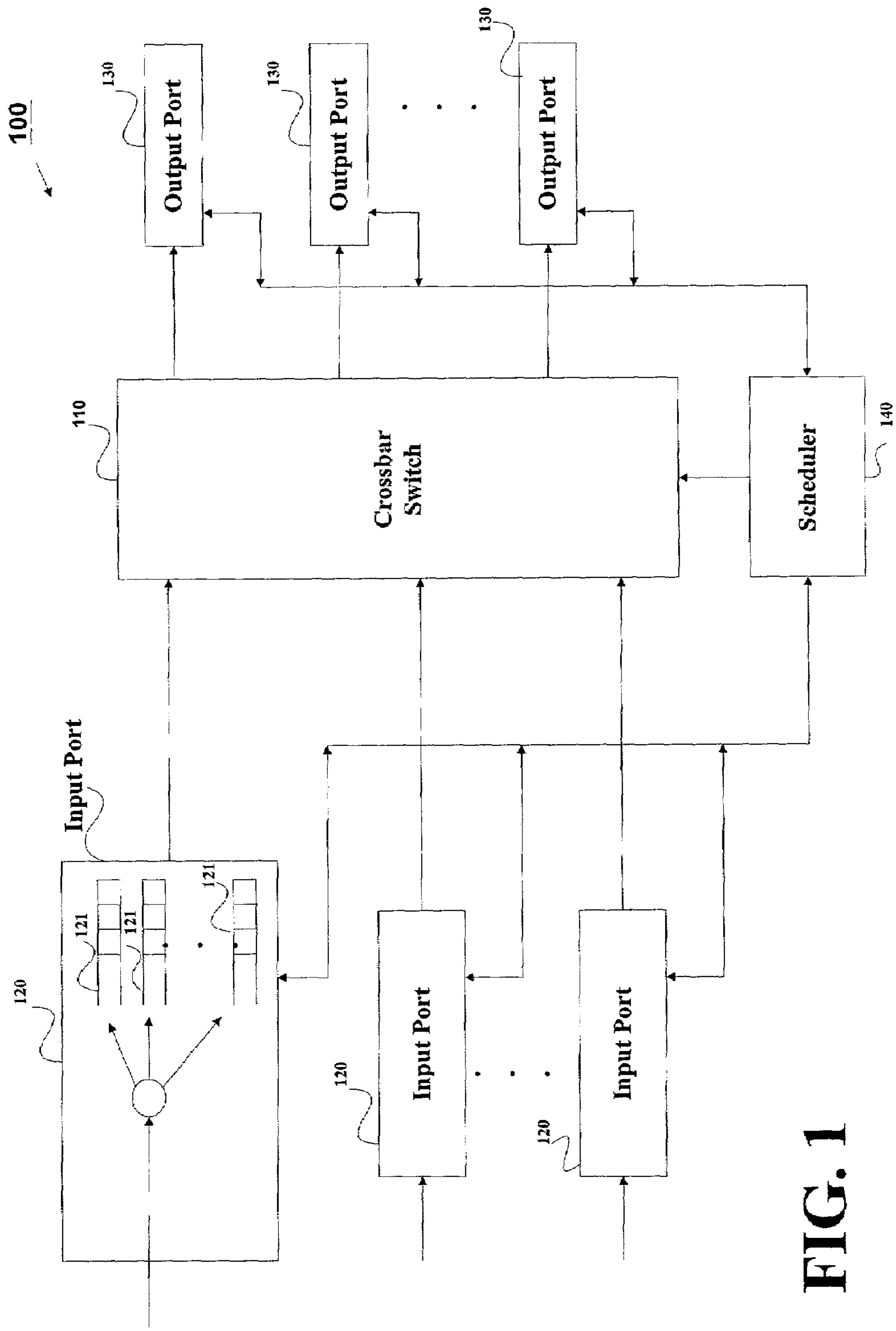
FIG. 1 illustrates a system block diagram of a switch, according to an embodiment of the present invention.

Embodiments of the present invention relate to parallel, weighted arbitration scheduling for a switch fabric. The scheduling can be performed at a set of ports for a switch fabric, for example, at a set of input ports and/or a set of output ports. Each port from the set of ports has its own set of links. On a per port basis, a subset of links from the set of links associated with that port is determined. Each link from the determined subset of links for that port is associated with a candidate packet. Each link from the set of links for that port is associated with a weight value. On a per port basis, a link from the determined subset of links for that port is selected based on the weight value for determined subset of links for that port.

A term "link" can be, for example, a potential path across a crossbar switch within the switch fabric between an input port and an output port. In other words, a given input port can potentially connected to any of many output ports within the crossbar switch. For a given time slot, however, a given input port will typically be connected to at most only one output port via a link. For a different time slot, that given input port can be connected to at most one output port via a different link. Thus, the crossbar switch can have many links (i.e., potential paths) for any given input port and for any given output port, although for a given time slot, only certain of those links will be activated.

A link is associated with a candidate packet when a packet is buffered at the input port for that link (e.g., buffered within a virtual output queue associated with that input port and the destination output port). Note that although the term "candidate packet" is used in reference to data queued at the input port, the other types of data such as cells can be considered.

The term "weight value" can be, for example, a value associated with a link based on a bandwidth-reserved rate assigned for that link. In other words, a bandwidth can be allocated to different links within the switch fabric based on the reserved rates of those links. In such an example, the weight value for each link can be updated in every time slot according to the reserved rate, the last scheduling decision and a penalization for non-backlogged, high weight-value links.

The scheduling techniques described herein can be considered as to three aspects. First, the scheduling techniques (or arbitration techniques) can combine parallel arbitration (among the set of input ports and/or among the set of output ports) with weighted arbitration. In other words, scheduling can be performed among the output ports in parallel and/or among the input ports in parallel while also being based on weight values for the links being considered for scheduling.

Second, the scheduling techniques can consider weighted values of the links separately from the perspective of the input ports and from the perspective of the output ports. Thus, a given link between its associated input port and output port has two different weight values (one from the input port perspective and one from the output port perspective) that are maintained separately by the respective input port and output port.

Third, the scheduling techniques can assess a penalty for non-backlogged links having a relatively high weight value. Thus, for a given port, any associated links without a candidate packet and having a weight value greater than the weight value of the link selected during arbitration can have their respective weight value penalized.

FIG. 1 illustrates a system block diagram of a switch, according to an embodiment of the present invention. Switch fabric 100 includes crossbar switch 110, input ports 120, output ports 130 and scheduler 140. Crossbar 110 is connected to input ports 120 and output ports 130. Scheduler 140 is coupled to crossbar switch 110, input ports 120 and output ports 130.

As shown for the top-most input port 120 of FIG. 1, each input port 120 has a set of queues 121 into which packets received at the input port are buffered. More specifically, each queue 121 is a virtual output queue (VOQ) uniquely associated with a specific output port 130. Thus, received packets (each designating a particular destination output port) are buffered in the appropriate VOQ for its destination output port.

In general, as packets are received at the input ports 120, they are subsequently routed to the appropriate output port 130 by the crossbar switch 110. Of course, packets received at different input ports 120 and destined for the same output port 130 can experience contention within the crossbar switch 110. Scheduler 140 resolves such contention, as discussed below, based on an arbitration (or scheduling) process.

Scheduler 140 uses a parallel, matching scheme that supports rate provisioning. Using this rate-provisioning scheme, scheduler 140 is capable of supporting quality of service (QoS) in traffic engineering in the network (to which switch 100 is connected; not shown). In addition, scheduler 140 provides a high throughput in the switch fabric.

Note that input line cards (coupled to the switch fabric 100 but not shown in FIG. 1) can perform the scheduling and intra-port rate-provisioning among all flows that are destined to the same output port. The switch fabric 100 can operate on a coarser granularity and can perform inter-port rate provisioning, and can consider the flows that share the same input/output pair as a bundled aggregate flow. In this way, the number of micro flows is seamless to the rate-provisioning scheme used by the switch fabric 100 and its complexity is independent of the number of micro-flows.

Generally speaking, scheduler 140 performs three steps during the arbitration process: generating requests, generating grants and generating accepts. The grant and accept steps are carried out according to the reserve rates of the links associated with the specific input ports 120 and output ports 130. To keep track of the priorities of different links, scheduler 140 assigns a weight value (or credit value), for example, to every link at every port.

In other words, a given input port 120 can be associated with a set of links across crossbar switch 110, whereby the given input port 120 can be connected to a set of output ports 130 (e.g., every output port 130). Similarly, a given output port 130 is associated with a separate set of links across crossbar switch 110, whereby the given output port 130 can be connected to a set of input ports 120 (e.g., every input port 120). Scheduler 140 can be configured so that, for example, a link with a higher weight value has a higher priority. A weight vector can represent the weight values for the set of links associated with a given port. In other words, a given link can have an associated weight value; a set of links for a given port can have an associated weight vector, where the weight vector comprises a set of weight values.

The weight vectors can be represented mathematically. More specifically, a weight vector, i.e., $CI^i(n)=(CI_1^i(n), \ldots, CI_N^i(n))$, can be assigned to input $\overline{\text{port i}}$, and similarly, a weight vector, i.e., $CO^j(n)=(CO_1^j(n), \ldots, CO_N^j(n))$, can be assigned to output $\overline{\text{port}}$ j, where n is the time index. The kth entry (i.e., the kth weight value), where $1 \leq k \leq N$, of every weight vector corresponds to the kth link of the associated port.

The weight values associated with the links are updated by scheduler 140 according to reserved rates of the links and last scheduling decision. In other words, for each time slot, the weight value associated with every link is increased by the link's reserved rate and decreased when the link is served (i.e., when that link is selected during the arbitration process so that a packet is scheduled for transit via that link). Thus, the weight value of a link indicates how much service is owed to that link. Said another way, the weight value indicates the extent to which a given link is given priority over other links where that priority increases over time until the link is serviced. The reserved rates of the links can be predefined and/or can be adjusted during the operation of the switch.

In addition, certain weight values are updated based on a penalty. More specifically, the weight values associated with non-backlogged, high-weight-value links are penalized during a given time slot. In other words, for a given port, any associated links without a candidate packet (buffered at the associated virtual output queue) and having a weight value greater than the weight value of the link selected during the arbitration process have their weight values penalized. The weight values of such links can be, for example, decreased an amount related to the link bandwidth.

The operation of scheduler 140 can also be represented mathematically. More specifically, consider input port i and output port j, and suppose that $CI_{max}^j(n)$ and $CO_{max}^j(n)$ are the maximum weights selected in the accept and grant steps, respectively. The reserved rate for link (i,k) is $r_{ik}$, and $A_{ik}(n)$ is the serving indicator of that link, i.e., $$A_{ik}(n) = \begin{cases} 1 & \text{if } (i, k) \text{ is served} \\ 0 & \text{otherwise} \end{cases} \quad (1)$$

For link (i, k) and at input port i, the penalty for a non-backlogged, high-weight-value link, $DI_k^i(n)$, is $$DI_k^i(n) = \begin{cases} 1 & \text{if } (i, k) \text{ is non-backlogged and } CI_k^i(n) \geq CI_{\max}^i(n) \\ 0 & \text{otherwise} \end{cases} \quad (2)$$

$CO_{max}^j(n)$ is defined for output port j in a similar way. For link (j, k) and at output port j, the penalty for a non-backlogged, high-weight-value link, $DO_k^j(n)$, is $$DO_k^j(n) = \begin{cases} 1 & \text{if } (j, k) \text{ is non-backlogged and } CO_k^j(n) \geq CO_{\max}^j(n) \\ 0 & \text{otherwise} \end{cases} \quad (3)$$

Note that DI's and DO's specify the weight values that are decremented to penalize the corresponding links. Hence, the weight vector updating rule for the k-th element of input port i and output port j are, $$CI_k^i(n+1)=CI_k^i(n)+r_{ik}(n)-(DI_k^i(n)+A_{ik}(n))$$

$$CO_k^j(n+1)=CO_k^j(n)+r_{kj}(n)-(DO_k^j(n)+A_{kj}(n)) \quad (4)$$

Penalizing advantageously limits a non-backlogged link from increasing unboundedly. Without penalization, a weight value for a non-backlogged link could increase unboundedly. Then, when such a link receives a number of packets, the link would distract the service of the other links due to its very high weight value. Moreover, the output pattern of such a scheduler would become very bursty. An alternative approach of reducing the weight value to zero inappropriately introduces a delay on any low-rate links that are non-backlogged most of the time. Thus, the penalizing herein reduces the weight value of a non-backlogged link, for example, by the link's throughput.

In an alternative embodiment, the weight values of the links within a weight vector can be adjusted (either increased or decreased) (separate from the above-described weight vector adjustment). The weight vector can be so adjusted without affecting the overall performance of the scheduler because the rate-provisioning method described herein is based on the relative differences between link weight values, not on their absolute values.

Figure 2:
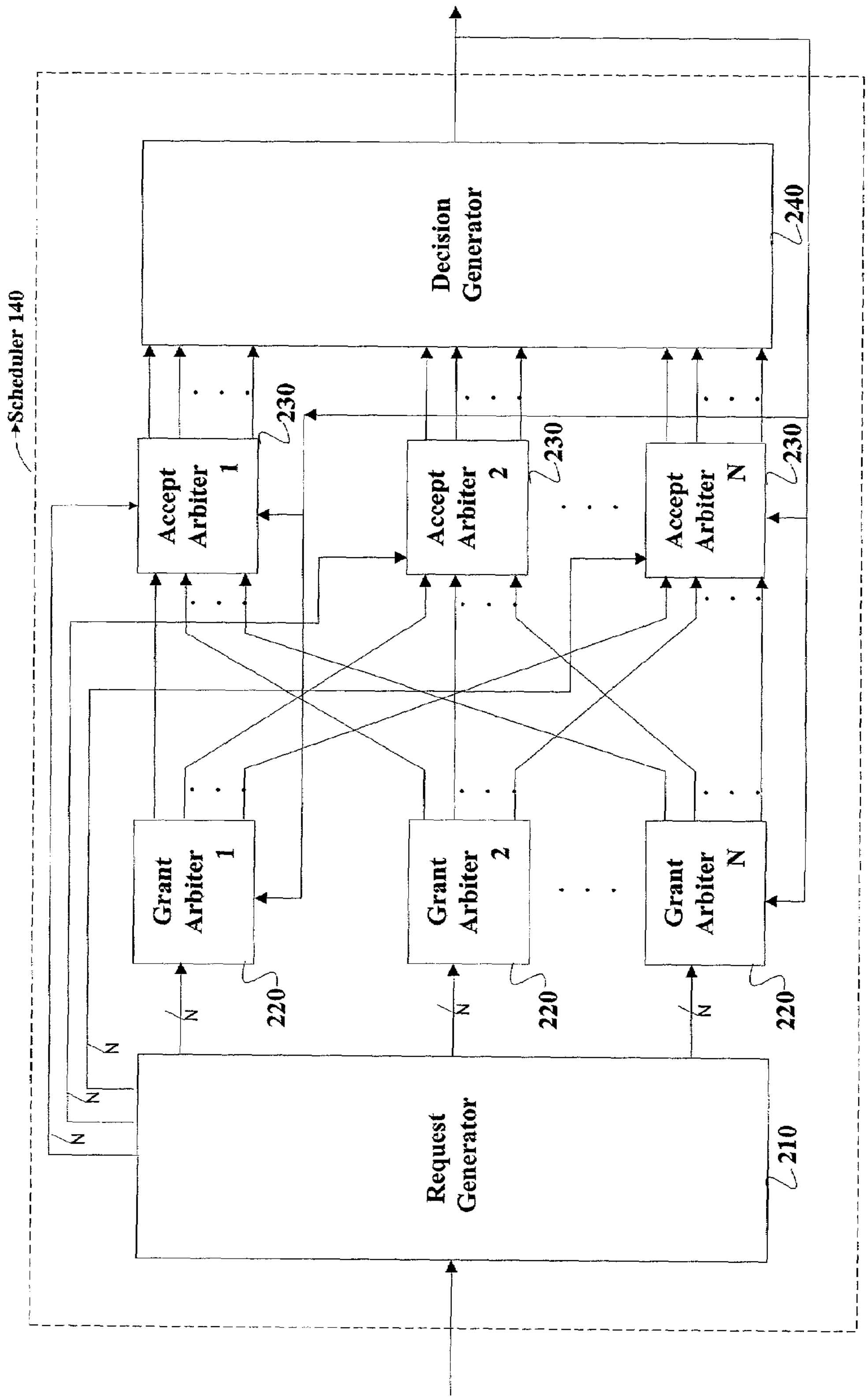
FIG. 2 shows a system block diagram of the scheduler shown in FIG. 1

FIG. 2 shows a system block diagram of the scheduler shown in FIG. 1. As shown in FIG. 2, scheduler 140 includes request generator 210, grant arbiters 220, accept arbiters 230 and decision generator 240. Request generator 210 receives input signals from the input ports 120. Request generator 210 is connected to grant arbiters 220 and accept arbiters 230. A given grant arbiter 220 is connected to each accept arbiter 230. The accept arbiters 230 are connected to decision generator 240. Decision generator 240 provides output signals to crossbar switch 110 and provides feedback signals to grant arbiters 220 and accept arbiters 230.

Figure 3:
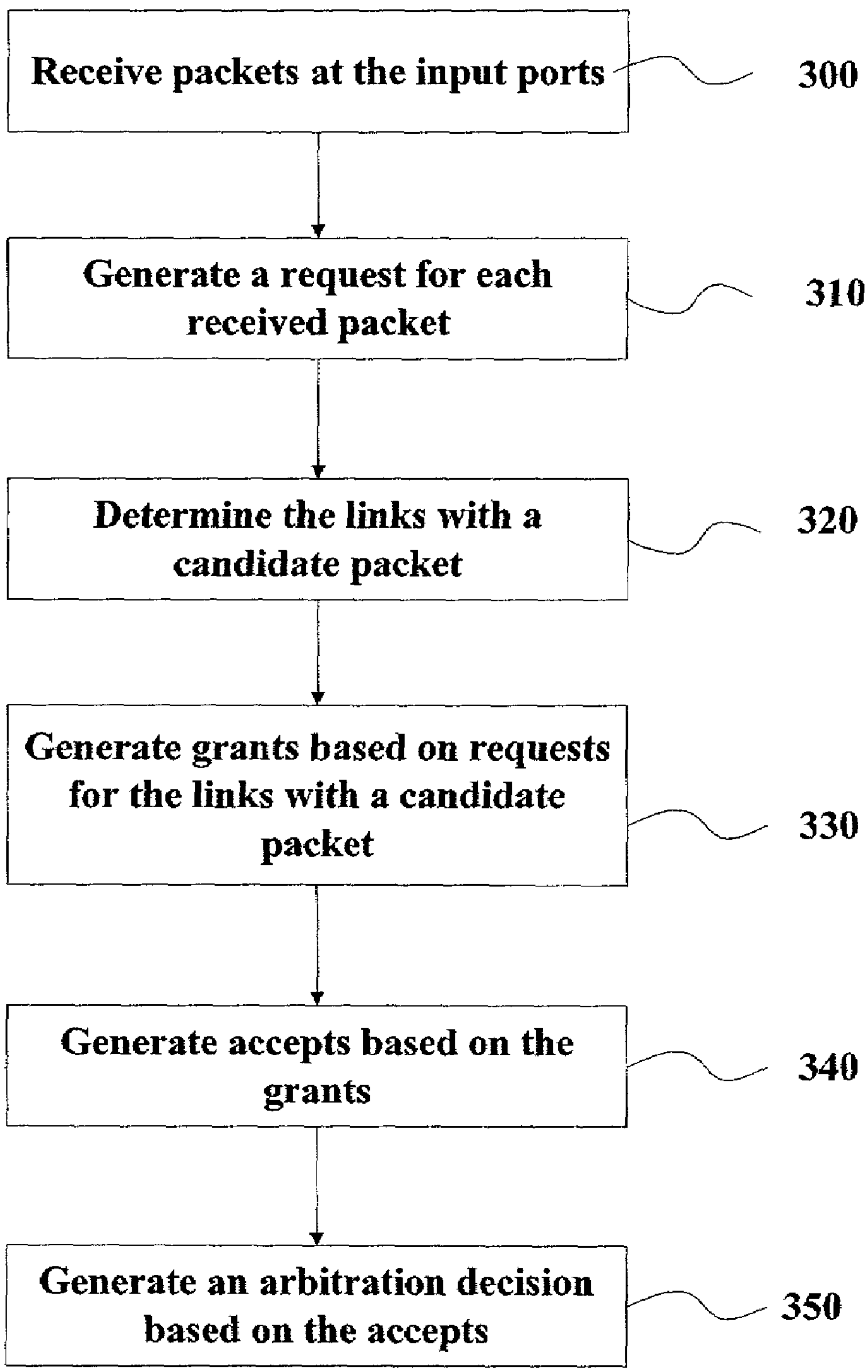
FIG. 3 shows a flowchart of an arbitration process, according to an embodiment of the present invention.

FIG. 3 shows a flowchart of an arbitration process, according to an embodiment of the present invention. At step 300, packets are received at input ports 120. Input signals are provided to request generator 210 based on the received packets. At step 310, request generator 210 can generate a request for each packet received at an input port 120 based on the received input signals. This request identifies, for example, the source input port 120 and the destination output port 130 for a given packet, and represents a request to transit the crossbar switch 110. Accordingly, the requests generated by request generator 210 are provided to the appropriate grant arbiters 220.

At step 320, grant arbiters 220 determine which links have an associated candidate packet based on the requests received from request generator 210. In other words, request generator 210 generates a request(s) for each link associated with a buffered candidate packet(s). Thus, grant arbiters 220 can determine which links have an associated candidate packet, for example, by identifying for which input port 120 a request has been generated.

At step 330, grant arbiters 220 generate grants based on the requests received from request generator 210. Grant arbiters 220 can be configured on a per output-port basis or on a per input-port basis. In other words, step 320 can be performed on a per output-port basis or on a per input-port basis. For example, where the grants are determined on a per input-port basis the request associated with a particular input port 120 is sent to the corresponding grant arbiter 220. In such a configuration, requests from the first input port 120 are sent to the first grant arbiter 220; requests from the second input port 120 are sent to the second grant arbiter 220; and requests from the $n^{th}$ input port 120 are sent to the $n^{th}$ grant arbiter 220.

Alternatively, where grants are determined on a per output-port basis, the request associated with a particular output port 130 is sent to the corresponding grant arbiter 220. In such a configuration, a request that designates the first destination output port 130 is sent to the first grant arbiter 220; a request that designates the second output port 130 is sent to the second grant arbiter 220; and a request that designates the $n^{th}$ output port 130 is sent to the nth grant arbiter 220.

Grant arbiters 220 send an arbitration signal indicative of a grant to the appropriate accept arbiters 230. More specifically, a given grant arbiter 220 can receive a set of requests (i.e., as few as no requests or as many requests as there are associated links). In the case of a grant arbiter 220 that receives one or more requests, that grant arbiter 220 sends an arbitration signal indicative of a grant to the accept arbiter associated with that grant.

At step 340, accept arbiters 230 generate accepts based on the grants generated by grant arbiters 220. Accept arbiters 230 be configured on either a per input-port basis or a per output-port basis depending on the configuration of the grant arbiters 220. In other words, step 340 can be performed on a per input-port basis or on a per output-port basis. More specifically, if step 330 is performed on a per input-port basis by the grant arbiters 220, then step 340 is performed on a per output-port basis by accept arbiters 230. Similarly, if step 330 is performed on a per output-port basis by grant arbiters 220, then step 340 is performed on a per input-port basis by accept arbiters 230. Once the accepts are generated by accept arbiters 230, arbitration signals indicating the accepts are provided to the decision generator 240.

At step 350, decision generator 240 generates an arbitration decision for a given time slot based on the accepts generated by the accept arbiters 230 and provides a signal indicative of the arbitration results for the given time slot to crossbar switch 110. In addition, the signal indicative of the arbitration results is also sent from decision generator 240 to the grant arbiters 220 and accept arbiters 230 so that the weight values can be updated. The weight values are updated based on which requests were winners in the arbitration process. In addition, certain weight values will be penalized based on this feedback information from decision generator 240. Weight values are penalized for links having a weight value higher than the link selected but not having a candidate packet buffered at their associated virtual output queues. Said another way, in the cases where a link with a higher weight value than the selected link but no buffered candidate packet (awaiting switching across the crossbar switch 110), then that link should be accordingly penalized and its weight value reduced.

Note that although the arbitration process has been described in connection with FIG. 2 for a given time slot, arbitration can be performed multiple times iteratively within a given time slot. In such an embodiment, for example, arbitration winners from prior iterations within a given time slot are removed from consideration and additional iterations of arbitration is performed for the arbitration losers to thereby provide more arbitration winners within a given time slot.

Figure 4:
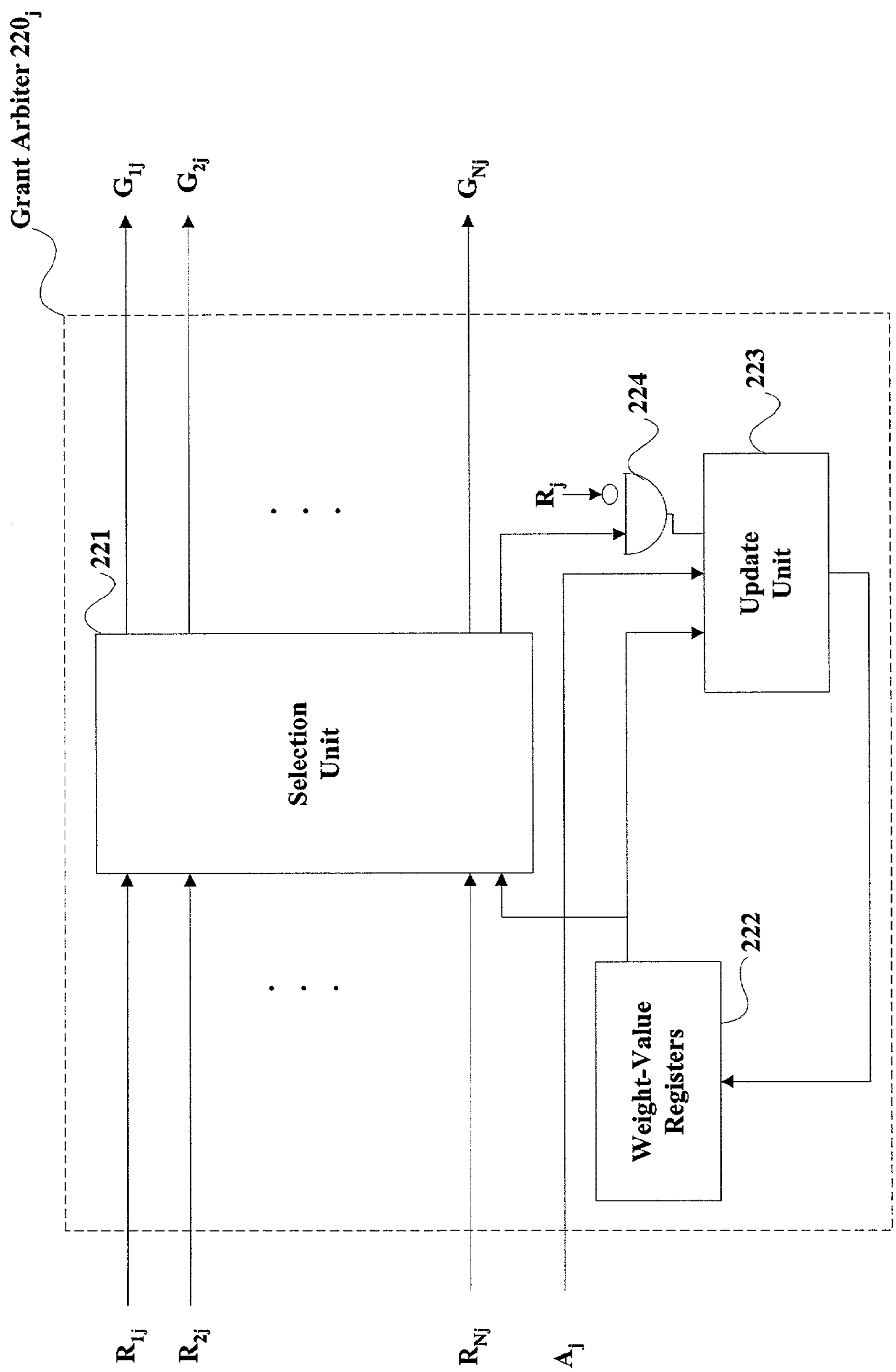
FIG. 4 shows a system block diagram of a grant arbiter, according to an embodiment of the present invention.

FIG. 4 shows a system block diagram of a grant arbiter, according to an embodiment of the present invention. A given grant arbiter 220 includes selection unit 221, weight-value registers 222, update unit 223 and logic "and" 224. Selection unit 221 receives requests $R_{1j}$ through $R_{Nj}$ from request generator 210 and provides an arbitration signal indicative of a grant, $G_{1j}$ through $G_{Nj}$ to an accept arbiter 230. Although a selection unit 221 typically provides a single arbitration signal indicative of a grant, FIG. 4 shows the multiple connections from a selection unit 221 upon which a given arbitration signal, $G_{1j}$ through $G_{Nj}$, can be carried to an accept arbiter 230.

The arbitration signal indicative of a grant is also provided to logic "and" 224 from selection unit 221. Logic "and" 224 also receives a request, $R_j$, and is coupled to update unit 223. Update unit 223 is also coupled to weight-value registers 222. Weight-value registers are also coupled to selection unit 221 and provide a signal back to update unit 223. Update unit 223 also receives a feedback signal indicative of the arbitration results for which an accept, $A_j$, was generated.

Figure 5:
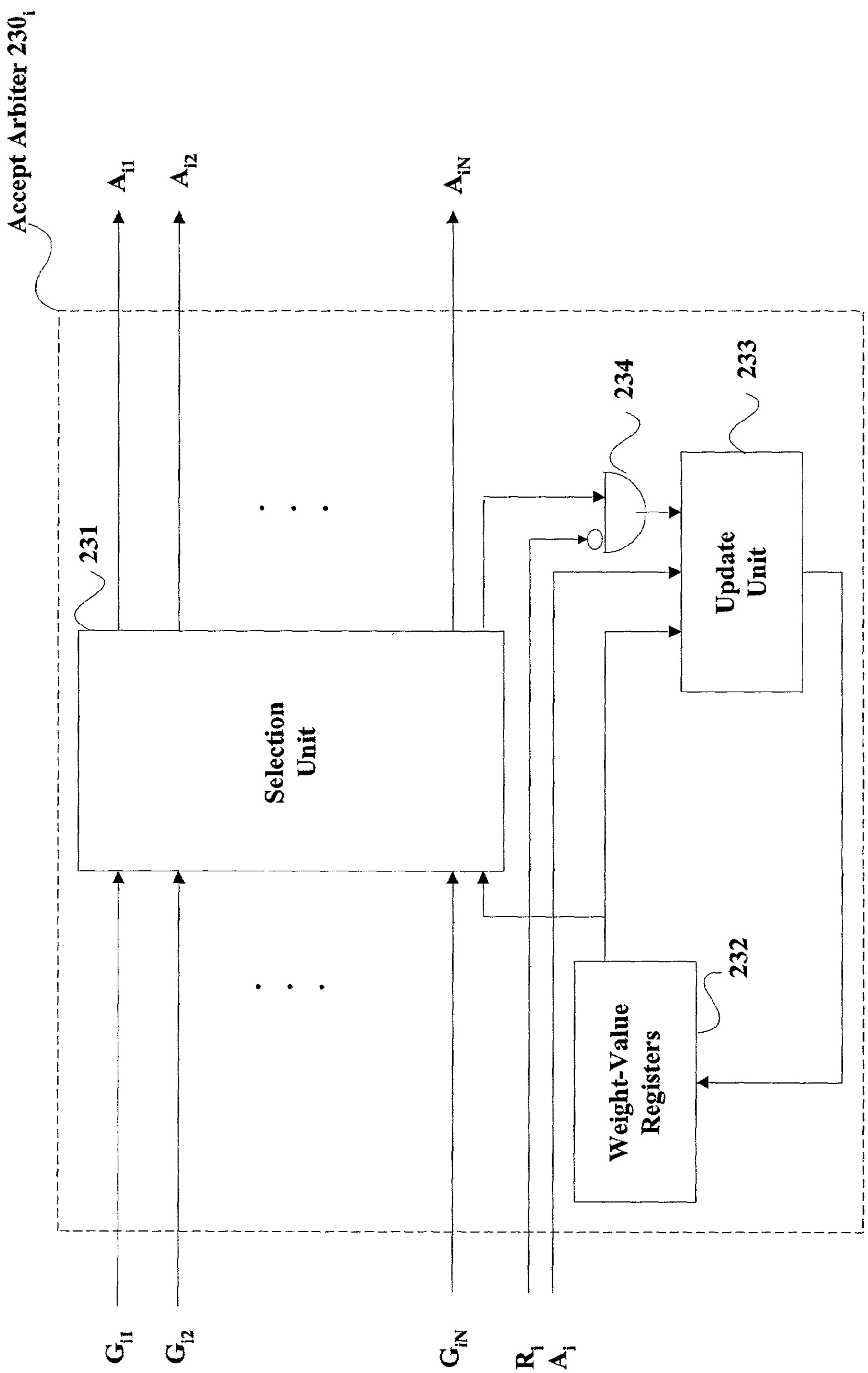
FIG. 5 shows a system block diagram of an accept arbiter, according to an embodiment of the present invention.

FIG. 5 shows a system block diagram of an accept arbiter, according to an embodiment of the present invention. A given accept arbiter 230 includes selection unit 231, weight-value registers 232, update unit 233 and logic "and" 234. Selection unit 231 receives a set of arbitration signals each indicative of a grant (i.e., zero or more signals from $G_{i1}$ through $G_{iN}$) from the corresponding grant arbiters 220 (shown in FIG. 2). Selection unit 231 produces at most one arbitration signal indicative of an accept, $A_{i1}$ through $A_{iN}$. Selection unit 231 also provides the at most one arbitration signal indicative of an accept to logic "and" 234. Logic "and" 234 also receives a request $R_i$ and produces a signal to update unit 233. Update unit 233 provides a signal to weight-value registers 232. Weight-value registers 232 provide a signal to selection unit 231 and to update unit 233. In addition, update unit 233 also receives an arbitration signal indicative of an accept, $A_i$.

Figure 6:
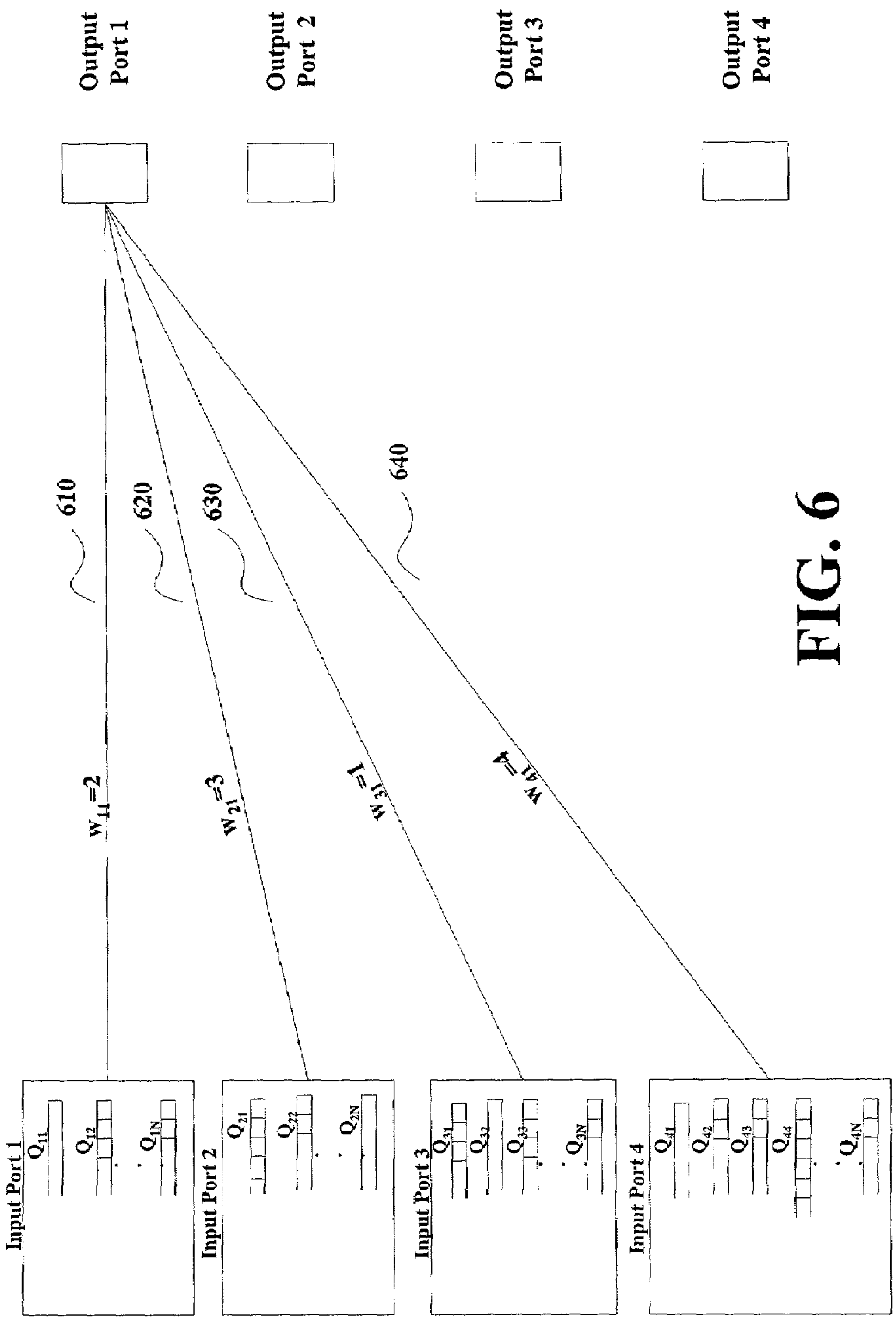
FIG. 6 shows elements related to an example of a grant step of arbitration within a switch, according to an embodiment of the present invention.

FIG. 6 shows elements related to an example of the arbitration process within a switch, according to an embodiment of the present invention. FIG. 6 represents the weight values for links across a crossbar switch that connects input ports to output ports. The example of FIG. 6 is based on the grant step of arbitration being performed on a per output-port basis.

As shown in FIG. 6, a given output port 1 can be connected across the crossbar switch by links 610, 620, 630 and 640 to the various input ports 1, 2, 3 and 4, respectively. As shown in FIG. 6, lines 610, 620, 630 and 640 have weight-values $w_{11}=2$, $w_{21}=3$, $W_{31}=1$ and $w_{41}=4$, respectively. For the virtual output queues of each input port, the virtual output queues are labeled in FIG. 6 with an index that indicates the combination of an input port and output port.

For example, input port 1 has a virtual output queue labeled $Q_{11}$ associated with the output port 1. This queue has no buffered candidate packets received at input port 1 and destined for output port 1. Input port 1 also has a series of other virtual output queues associated with the remaining destination output ports, such as for example, $Q_{12}$ through to $Q_{1N}$. The remaining input ports have similar virtual output queues. For purposes of the illustration in FIG. 6, input ports 2 and 3 both have buffered candidate packets in the associated virtual output queues related to output port 1, i.e., $Q_{21}$ of input port 2 and $Q_{31}$ of input port 3. The output ports 1 and 4, however, do not have candidate packets buffered for the destination output port 1; in other words, $Q_{11}$ and $Q_{41}$ do not have any buffered candidate packets.

Following the example of FIG. 6, the grant step of arbitration is performed by selecting a subset of links for which each has a candidate packet buffered at the associated virtual output queue. As mentioned above, in this example of FIG. 6, only link 620 and link 630 have an associated candidate packet.

Next, a grant is determined for the link having the highest weight value from the selected subset of links. In this example, the link 620 has the highest weight-value (i.e., $w_{21}$ equal to 3) which is greater than the weight-value for the link 630 (i.e., $w_{31}$ equal to 1). Thus, a grant is generated for link 620.

Note that although FIG. 6 shows an example of the grant step for output port 1, the other output ports also perform the grant step in parallel. Thus, just as output port 1 produces a grant for input port 2, the remaining output ports also produce at most one grant for an associated input port (which possibly can also be input port 2, or some other input port).

Figure 7:
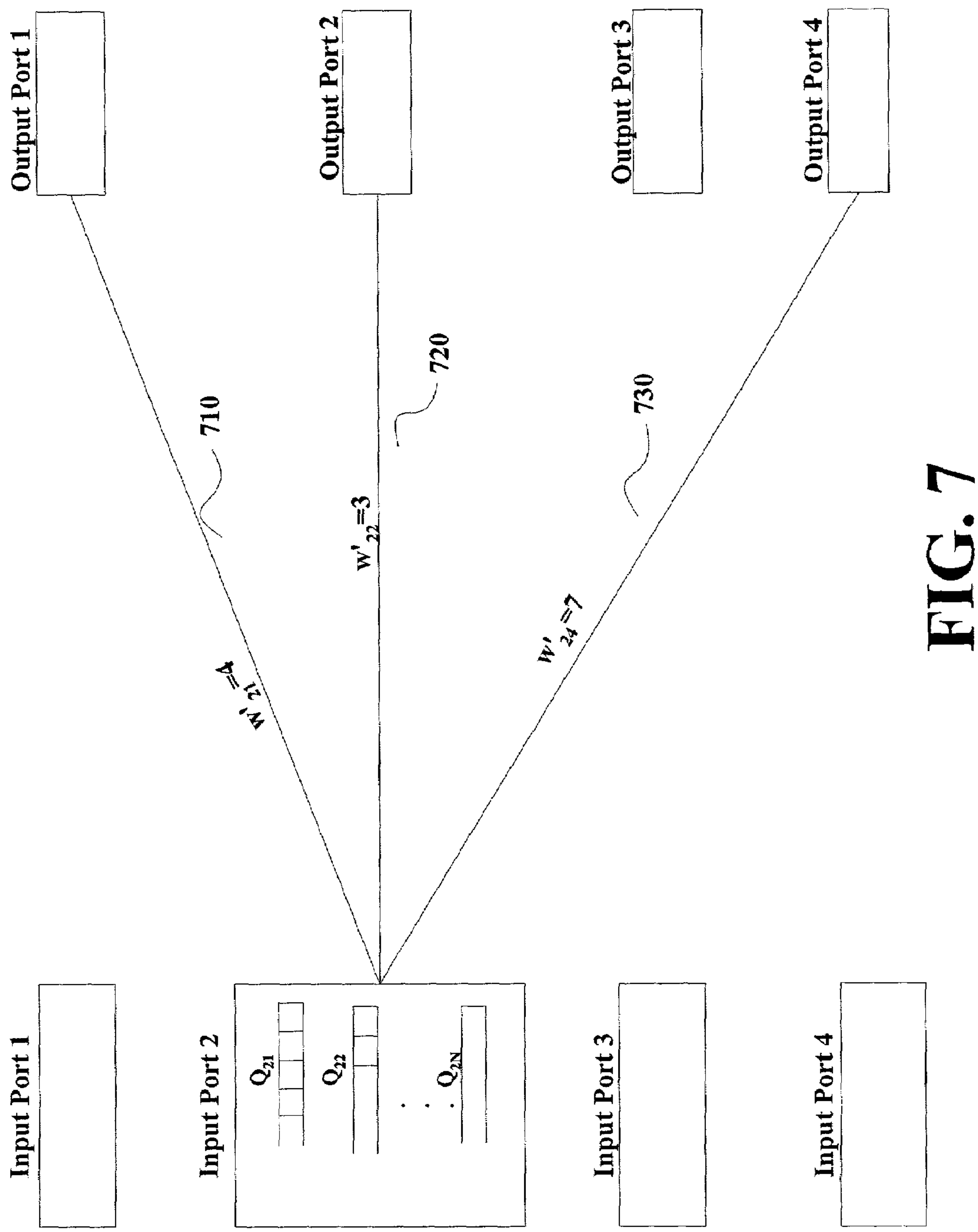
FIG. 7 shows elements related to an example of an accept step of arbitration based on the example shown in FIG. 6.

FIG. 7 shows elements related to an example of the accept step of arbitration based on the example shown in FIG. 6. As shown in FIG. 7, the accept step is performed on a per input-port basis; this corresponds to the grant step being performed on a per output-port basis. For purposes of clarity, FIG. 7 shows specific details for only input port 2 while omitting the similar details for the remaining input ports.

In the example shown in FIG. 7, input port 2 has received a grant for links 710, 720 and 730. The received grant for link 710 corresponds to the grant sent from output port 1 to input port 2 shown in FIG. 6. The received grants for links 720 and 730 (received from output ports 2 and 4, respectively) were generated in parallel with the grant for link 710, although not shown in FIG. 6.

During the accept step shown by FIG. 7, input port 2 will select the link having the highest weight value, which in this case is the link 730. In other words, an accept is generated for the link 730 because its weight value (i.e., $w'_{24}$ equal to 7) is greater than the weight value of the remaining links 710 and 720 (i.e., $w'_{21}$ equal to 4 and $w'_{22}$ equal to 3).

Note that the weight values for the links from the perspective of the input ports are different than the weight values for the links from the perspective of the output ports. More particularly, each output port and each input port will maintain its own distinct weight vector for its respective links. Thus, the weight-value for a particular link from the output port may have a different weight-value for that same link from the perspective of the input port. For example, note that link 620 (shown in FIG. 6) from the perspective of input port 2 has a different weight value ($w_{21}$ equal to 3) than for the weight value for link 710 (shown in FIG. 7) from the perspective of output port 1 ($w'_{21}$ equal to 4). In sum, the weight values for a link from the output port perspective can be separate and independent from the weight values for the link from the input port perspective. Following the examples shown in FIGS. 6 and 7, certain weight values are updated based on a penalty. For example, the link between input port 4 and output 1 is penalized. As shown in FIG. 6, the link 620 is selected during the grant step because it has the highest weight value ($w_{21}$ equal to 3) among the links associated a candidate packet (e.g., links 620 and 630). Of the remaining links for output port 1, links 610 and 640 are not associated with a candidate packet. Of these two links, only link 640 has a weight value ($w_{41}$ equal to 4) greater than the weight value of the selected link (i.e., $w_{21}$ equal to 3 for link 620). Thus, the weight value for the link between output port 1 and input port 4 is penalized. The weight value for this link should be penalized from both the perspective of the output port and the input port. Thus, from the perspective of output port 1, the weight value $w_{21}$, for link 640 is penalized, for example, by reducing it from a value of 4to 3. In addition, the weight value, $w'_{41}$, for the link between input port 4 and output 1 from the perspective of input port 4 (not shown in FIGS. 6 and 7) is also reduced, for example, by a penalty of 1.

Figure 8:
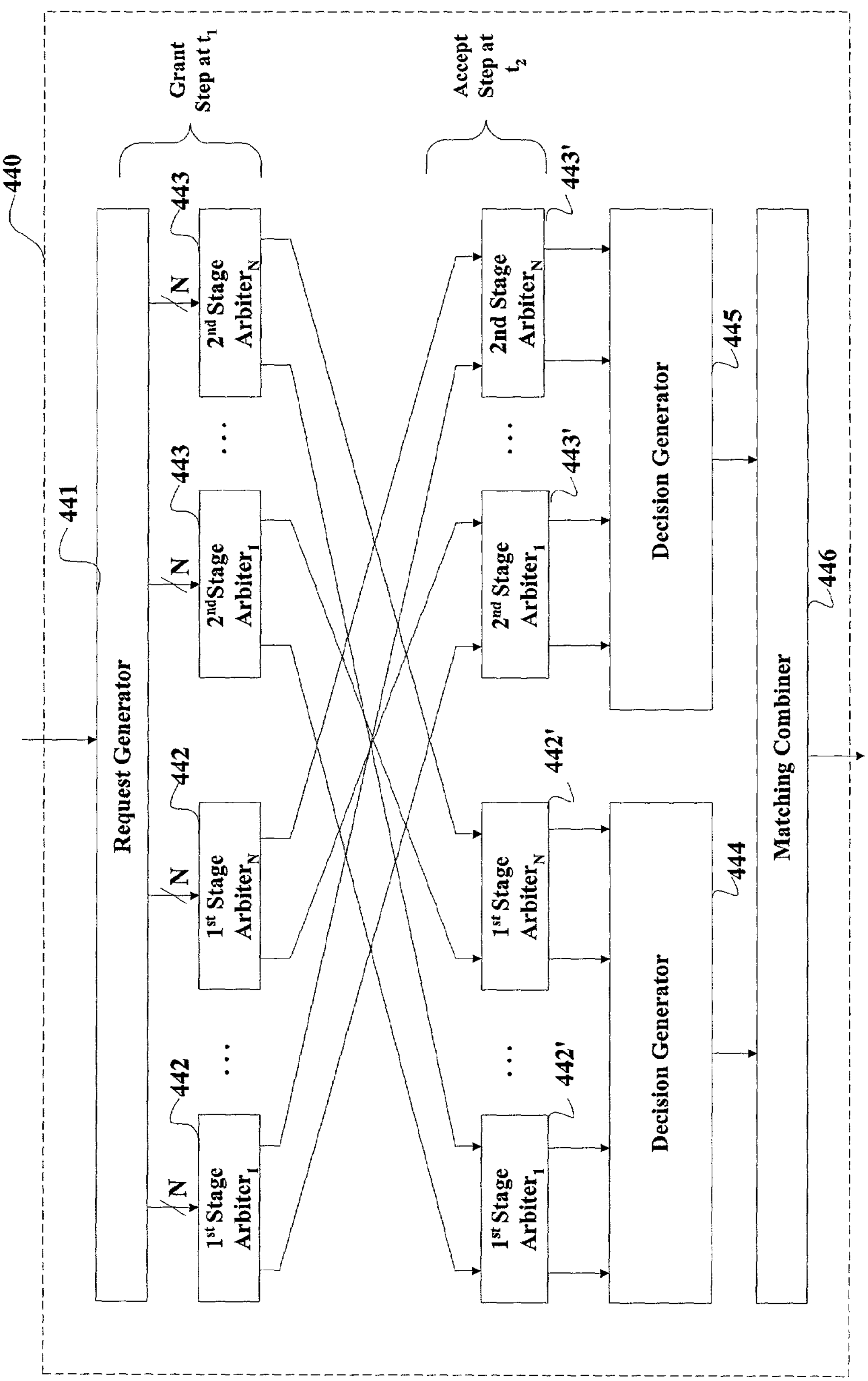
FIG. 8 shows a system block diagram of a scheduler, according to another embodiment of the present invention.

FIG. 8 shows a system block diagram of a scheduler, according to another embodiment of the present invention. As shown in FIG. 8, scheduler 440 includes request generator 441, first-stage arbiters 442, second-stage arbiters 443, decision generators 444 and 445, and matching combiner 446. Note that FIG. 8 shows the first-stage arbiters and second-stage arbiters at a first time, $t_1$, and at a second time, $t_2$. At the first time, $t_1$, the first-stage arbiters and second-stage arbiters are labeled as 442 and 443, respectively; at the second time, $t_2$, the first-stage arbiters and second-stage arbiters are labeled as 442' and 443', respectively. First-stage arbiters 442 and 442' are physically the same devices; second-stage arbiters 443 and 443' are physically the same devices. FIG. 8 shows the transmission of arbitration signals from first-stage arbiters 442 and second-stage arbiters 443 (determined during the first time, $t_1$) to second-stage arbiters 443' and first-stage arbiters 442', respectively (determined during the second time $t_2$).

Scheduler 440 operates in a manner similar to the scheduler discussed in reference to FIGS. 1 through 7, except that scheduler 440 performs two parallel sets of arbitration. Thus, rather than allowing the arbiters to remain idle during one half of the arbitration process, the arbiters of scheduler 440 operate for a second time during its otherwise idle time within a given time slot (or within a given iteration within the time slot). Consequently, scheduler 440 allows a second arbitration process to be performed in parallel without any additional hardware in the form of additional arbiters; matching combiner 446 is the only additional hardware for this embodiment of a scheduler over the scheduler discussed in reference to FIGS. 1 through 7.

In other words, the first-stage arbiters 442 and second-stage arbiters 443 perform the grant step of arbitration on a per input-port basis and on a per output-port basis, respectively. This grant step of arbitration can be performed during the first time, $t_1$, independently by the first-stage arbiters 442 and second-stage arbiters 443. Then, the first-stage arbiters 442' and second-stage arbiters 443' perform the accept step of arbitration on a per output-port basis and on a per input-port basis, respectively, based on the grants generated by the second-stage arbiters 443 and the first-stage arbiters 442, respectively. The accept step can be performed by the first-stage arbiters 442' and second-stage arbiters 443' during the second time, $t_2$. Again, note that the first-stage arbiters 442 and 442' are physically the same devices; second-stage arbiters 443 and 443' are physically the same devices.

The arbitration signals indicative of accepts are provided to decision generators 444 and 445, which independently generate separate arbitration decisions. These arbitration decisions are then provided to matching combiner 446, which provides an integrated arbitration decision for the associated switch fabric.

The matching combiner 446 can provide an integrated arbitration decision in a number of ways. For example, matching combiner 446 can determine the matching efficiency for each received arbitration decision (from decision generator 444 and from decision generator 445), and then output the arbitration decision having a higher matching efficiency for that time slot. For example, for a given a time slot, the matching combiner 446 might determine that the arbitration decision from decision generator 444 has the higher matching efficiency and select that arbitration decision. Then, for a subsequent time slot, the matching combiner 446 might select the arbitration decision from decision generator 445 if it has the higher matching efficiency. The matching efficiency can be, for example, the percentage of links that are scheduled for a given time slot.

Alternatively, matching combiner 445 can alternate each time slot between the two received arbitration decisions. In such an embodiment, the matching combiner 445 can select the arbitration decision from decision generator 444 at one time slot, then select the arbitration decision from decision generator 445 at the next time slot, and so on.

In yet another alternative, matching combiner 445 can select different portions of the switch fabric and the corresponding optimal portions of the arbitration decisions. In other words, matching combiner 445 can consider different portions of the switch fabric, and then, for each portion, matching combiner 445 can select the arbitration decision from either the decision generator 444 or decision generator 445 that is optimal (or at least not less optimal) for that portion of the switch fabric.

Figure 9:
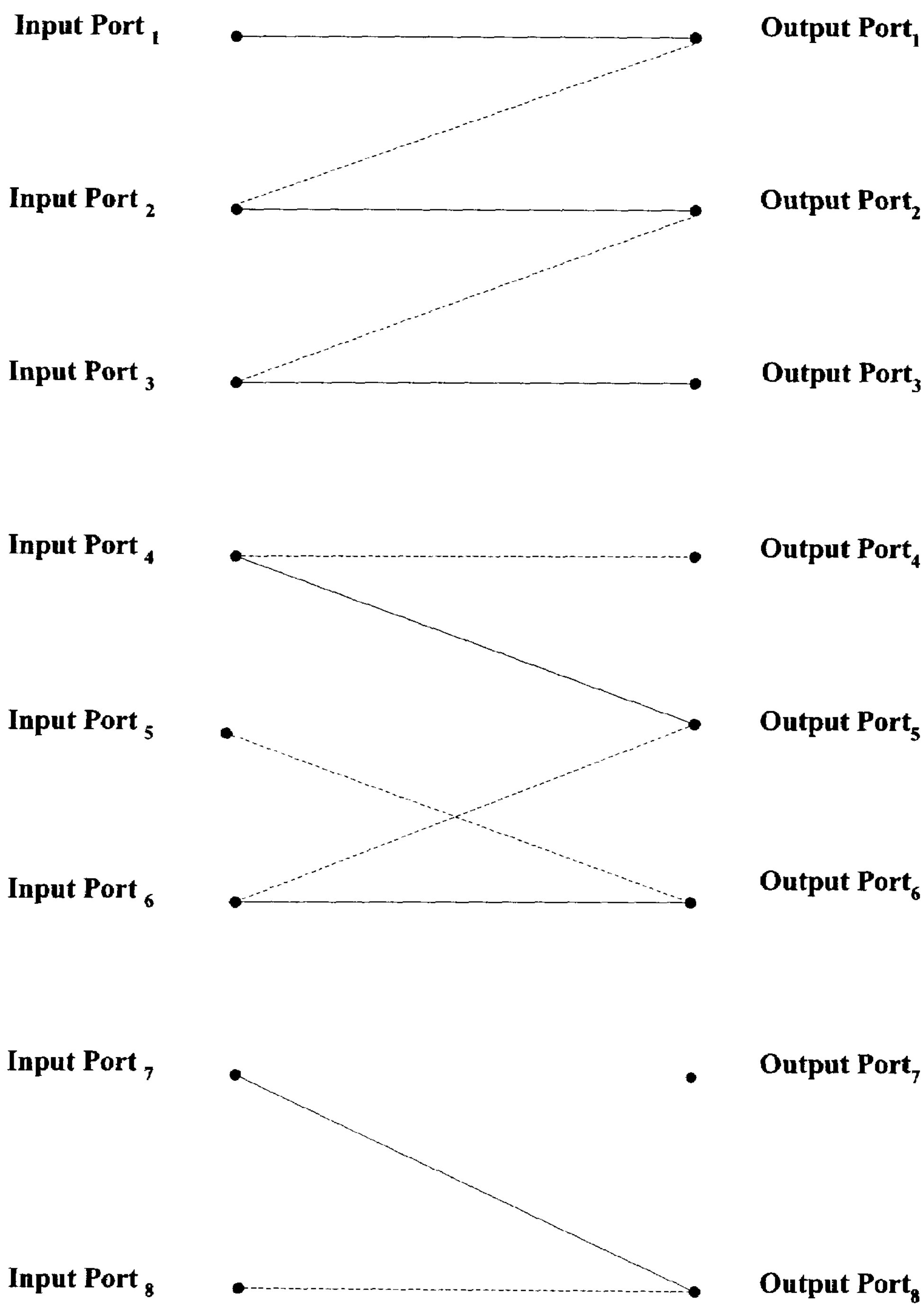
FIG. 9 shows an example of a link map between input ports and output ports based on two different arbitration decisions for a given time slot.

FIG. 9 shows an example of a link map between input ports and output ports based on two different arbitration decisions for a given time slot. The example shown in FIG. 9 illustrates different links within the switch fabric and the corresponding arbitration decisions. In FIG. 9, the solid lines between the input ports and the output ports can represent the arbitration decision from decision generator 444; the dotted lines between input ports and output ports can represent the arbitration decision from decision generator 445.

In the example shown in FIG. 9, the switch fabric can be considered in three sets of ports: input ports 1 through 3 and output ports 1 through 3; input ports 4 through 6 and output ports 4 through 7; and input ports 7 through 8 and output port 8. For the first set of ports, the number of arbitration decisions from decision generator 444 (i.e., the solid lines) exceeds the number of arbitration decisions from decision generator 445 (i.e., the dotted lines). Thus, for the first set of ports, the arbitration decisions from decision generator 444 is optimal. For the second set of ports, the number of arbitration decisions from decision generator 445 (i.e., the dotted lines) exceeds the number of arbitration decisions from decision generator 444 (i.e., the solid lines). Thus, for the second set of ports, the arbitration decisions from decision generator 445 are optimal. For the third set of ports, the number of arbitration decisions from decision generator 444 (i.e., the solid lines) equals the number of arbitration decisions from decision generator 445 (i.e., the dotted lines). Thus, for the third set of ports, the arbitration decisions from either decision generator 444 or 445 are sufficient.

Although the present invention has been discussed above in reference to examples of embodiments and processes, other embodiments and/or processes are possible. For example, although various embodiments have been described herein in reference to a switch fabric having an equal number of input ports and output ports, other embodiments are possible where the switch fabric has a number of input ports different from the number output ports.

Note that although examples of embodiments of switch fabric discussed above use the rate-provisioning method on both a per input-port basis and a per output-port basis, other embodiments can use the rate-provisioning method on a per input-port basis only or on a per output-port basis only. In such an embodiment, for example, the rate-provisioning method discussed herein can be used for the output ports while another method (e.g., the iSLIP method disclosed in U.S. Pat. No. 5,500,858, which is incorporated herein for background purposes) can be used for the input ports. Such an embodiment can have, for example, a greater number of input ports (e.g., each having a relatively low throughput) than the number of output ports (e.g., each having a relatively high throughput).

What is claimed is:

1. A method for arbitrating for a switch fabric having a plurality of ports, each port from the plurality of ports being associated with its own plurality of links, the plurality of ports including a first port and a second port, the method comprising:

selecting a link from the plurality of links associated with the first port based on a weight value associated with each remaining link associated with a candidate packet and being from the plurality of links associated with the first port; and determining a first penalty for a weight vector entity associated with the first port based on a weight value associated with each link from a first subset of links from the plurality of links for the first port, each link from the first subset of links not being associated with a candidate packet.

2. The method of claim 1, wherein:

the selected link is associated with a weight value greater than a weight value associated with each remaining link associated with a candidate packet and being from the plurality of links for the first port; and each link from the first subset of links is associated with a weight value greater than the weight value of the selected link.

3. The method of claim 1, further comprising:

selecting a link from the plurality of links associated with the second port based on a weight value associated with each remaining link associated with a candidate packet and being from the plurality of links associated with the second port; and determining a penalty for a weight vector entity associated with the second port based on a weight value associated with each link from a subset of links from the plurality of links for the second port, each link from the subset of links for the second port not being associated with a candidate packet.

4. The method of claim 3, wherein the plurality of links associated with the second port includes the selected link associated with the first port.

5. The method of claim 3, further comprising:

incrementing a weight value associated with each link from the plurality of links associated with the first port based on a priority associated with each link from the plurality of links associated with the first port; and incrementing the weight value associated with each link from the plurality of links associated with the second port based on a priority associated with each link from the plurality of links associated with the second port.

6. The method of claim 1, further comprising:

decreasing, for each link from the first subset of links associated with the first port, the weight value associated with that link by the determined first penalty, the determined first penalty being a function of a bandwidth associated with the first port; and decreasing the weight value associated with the selected link if an acceptance signal associated with the selected link is received.

7. The method of claim 3, wherein:

the first port is one from one of an output port and an input port;

the second port is an input port if the first port is an output port; and the second port is an output port if the first port is an input port.

8. The method of claim 1, wherein:

the selecting and the determining are performed for a first time slot; and the selected link not being subsequently accepted for arbitration.

9. The method of claim 8, further comprising:

selecting, within the first time slot, a second link from the plurality of links associated with the first port based on a weight value associated with each remaining link associated with a candidate packet and being from the plurality of links associated with the first port; and determining, for the first time slot, a second penalty for a weight vector entity associated with the first port based on a weight value associated with each link from a second subset of links from the plurality of links for the first port, each link from the second subset of links not being associated with a candidate packet.

10. The method of claim 9, further comprising:

decreasing, for each link from the first subset of links associated with the first port, the weight value associated with that link by the determined first penalty; and decreasing, for each link from the second subset of links associated with the first port, the weight value associated with that link by the determined second penalty unless the weight value associated with that link has been decreased by the determined first penalty.

11. An apparatus, comprising:

a selection unit associated with a plurality of links, the selection unit being configured to transmit an arbitration signal and a penalty signal based on a weight value associated with each link from the plurality of links; and an update unit coupled to the selection unit, the update unit configured to receive the penalty signal from the selection unit and to receive an accept signal, the update unit being configured to transmit an update signal based on the penalty signal and the accept signal.

12. The apparatus of claim 11, wherein:

the arbitration signal is associated with a selected link from the plurality of links, the selected link is associated with a candidate packet and is associated with a weight value greater than a weight value associated with each remaining link that is associated with a candidate packet and is from the plurality of links.

13. The apparatus of claim 11, wherein:

the penalty signal is associated with a subset of links from the plurality of links, each link from the subset of links is not associated with a candidate packet, each link from the subset of links is associated with a weight value greater than the weight value of a link associated with the arbitration signal.

14. The apparatus of claim 11, wherein the selection unit is configured to select a link from the plurality of links having a candidate packet and having a weight value greater than a weight value associated with each remaining link having a candidate packet from the plurality of links.

15. The apparatus of claim 11, wherein:

the update unit is configured to penalize a weight vector entity based on a subset of links from the plurality of links; and each link from the subset of links does not have a candidate packet and is associated with a weight value greater than the weight value of the link associated with the arbitration signal.

16. The apparatus of claim 15, wherein:

the weight vector entity includes a plurality of weight values each uniquely associated with a link from the plurality of links; and the update unit is configured to penalize the weight vector entity by decreasing, for each link from a subset of links from the plurality of links, the associated weight value as a function of a bandwidth associated with a port associated with the selection unit, each link from the subset of links is not associated with a candidate packet, each link from the subset of links has an associated weight value greater than the associated weight value of the remaining links from the plurality of links.

17. The apparatus of claim 16, wherein a weight value associated with the link associated with the arbitration signal is decreased by the update unit if the received accept signal indicates that the selected link has been scheduled.

18. The apparatus of claim 11, wherein:

the update signal indicates an increment to the weight value associated with each link from the plurality of links.

19. The apparatus of claim 11, wherein:

the accept signal indicates whether the link associated with the arbitration signal has been scheduled.

20. The apparatus of claim 11, further comprising:

a second selection unit associated with its own plurality of links, the second selection unit being configured to receive the arbitration signal from the selection unit, the second selection unit being configured to transmit the accept signal and a penalty signal associated with the second selection unit based on a weight value associated with each link from the plurality of links associated with the second selection unit; and a second update unit coupled to the second selection unit, the second update unit configured to receive the penalty signal from the second selection unit and the accept signal from the second selection unit.

21. The apparatus of claim 20, wherein:

the second update unit is configured to transmit an update signal based on the penalty signal associated with the second selection unit and the accept signal, the update signal indicates an increment to the weight value associated with each link from the plurality of links associated with the second selection unit, the link associated with the accept signal being from the plurality of links associated with the second selection unit.

22. The apparatus of claim 20, wherein:

the selection unit and the update unit are associated with one from the group of an output port and an input port;

the second selection unit and the second update unit are associated with an input port if the selection unit and the update unit are associated with an output port; and the second selection unit and the second update unit are associated with an output port if the selection unit and the update unit are associated with an input port.

23. An apparatus, comprising:

a selection unit associated with a plurality of links, the selection unit being configured to send, within a first time slot, a first arbitration signal and a first penalty signal based on a weight value associated with each link from the plurality of links; and an update unit coupled to the selection unit, the update unit configured to receive, within the first time slot, the first penalty signal from the selection unit and to receive a first accept signal, the update unit being configured to send, within the first time slot, an update signal based on the first penalty signal and the first accept signal, wherein the first penalty signal causes a reduction of a weight value for at least one of the plurality of links.

24. The apparatus of claim 23, wherein:

the first arbitration signal is associated with a selected link from the plurality of links; and the first accept signal indicates that the selected link was not subsequently accepted for arbitration.

25. The apparatus of claim 24, wherein:

the selection unit is configured to send, within the first time slot, a second arbitration signal and a second penalty signal based on a weight value associated with each link from the plurality of links;

the update unit is configured to receive, within the first time slot, the second penalty signal; and the update unit is configured to penalize a weight vector entity associated with each link from the plurality of links based on one from the group of the first penalty signal and the second penalty signal.

* * * * *